(12) United States Patent
Nigam et al.

(10) Patent No.: US 6,596,805 B1
(45) Date of Patent: Jul. 22, 2003

(54) AQUEOUS FAST-DRIABLE RESIN COMPOSITION AND ITS PRODUCTION PROCESS AND USE

(75) Inventors: Asutosh Nigam, Fremont, CA (US); Chien-Chang David Yao, Palo Alto, CA (US); Ravi S Renduchintala, Mountain View, CA (US); Koichiro Saeki, Suita (JP); Masakazu Morimoto, Ibaraki (JP); Takashi Miyai, Takatuski (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/576,148

(22) Filed: May 22, 2000

(51) Int. Cl.[7] ............................ C08L 31/06; C08K 5/098
(52) U.S. Cl. ...................... 524/527; 347/100; 106/493; 106/494; 106/499; 523/160
(58) Field of Search ................................ 106/493, 413, 106/494, 495, 496, 497, 498, 499, 503, 31.75, 31.76, 31.77, 31.78, 31.8; 347/100; 523/160; 524/527

(56) References Cited

U.S. PATENT DOCUMENTS

| 4,154,618 A | 5/1979 | Burke |
| 5,250,107 A | 10/1993 | Bares |
| 5,641,350 A | 6/1997 | Chassot et al. |

FOREIGN PATENT DOCUMENTS

| EP | 0 360 212 A2 | 3/1990 |
| EP | 0 594 321 A1 | 4/1994 |
| EP | 6-145590 A | 5/1994 |
| EP | 0 952 195 A2 * | 10/1999 |
| JP | 51-59928 | 5/1976 |
| JP | 5-194894 A | 8/1993 |
| JP | 62-40191 A | 8/1994 |
| JP | 6-240191 A | 8/1994 |
| JP | 8-231872 A | 9/1996 |
| JP | 10-140059 A | 5/1998 |
| WO | WO 94/10235 A1 | 5/1994 |
| WO | WO 95/27759 A1 | 10/1995 |

* cited by examiner

Primary Examiner—Robert D. Harlan
(74) Attorney, Agent, or Firm—Hangen Law Firm PLLP

(57) ABSTRACT

The present invention provides: an aqueous fast-drying resin composition which is excellent in the fast driability and can exhibit performances with regard to adhesion and resistance on a level with those of solvent type compositions; a production process for the aqueous fast-drying resin composition; and a use of the aqueous fast-drying resin composition as a gravure ink composition. An aqueous fast-drying resin composition comprises an anionic resin, a cationic resin, and a polyvalent metallic compound. In addition, another aqueous fast-drying resin composition comprises an aqueous medium and a resin component wherein the aqueous medium will be removed by drying. In this aqueous fast-drying resin composition, the resin component is combined with a polyvalent metallic compound and includes a combination of an anionic resin and a cationic resin. The production process for the aqueous fast-drying resin composition comprises the step of combining the anionic resin, the cationic resin, and the polyvalent metallic compound. The gravure ink composition comprises the above aqueous fast-drying resin composition and a pigment and/or dye.

18 Claims, No Drawings

US 6,596,805 B1

AQUEOUS FAST-DRIABLE RESIN COMPOSITION AND ITS PRODUCTION PROCESS AND USE

BACKGROUND OF THE INVENTION

A. Technical Field

The present invention relates to: an aqueous fast-drying resin composition which exhibits performance favorable for uses such as gravure ink; and a production process and a use for the aqueous fast-drying resin composition.

B. Background Art

In recent years, from the viewpoint of environmental problems of air pollution and so on, attempts are made to convert conventional solvent type compositions into aqueous compositions in fields of various printing inks, paints, adhesives, and so on. However, it is difficult to except the fast driability from conventional aqueous components. Thus, for example, in the printing field where plastic films are used as substrates mainly for packaging materials, there are problems in respect to driability or wettability upon substrates, therefore the practicization has hardly yet been achieved except some uses.

For the purpose of enhancing the fast driability of aqueous compositions, there might occur methods in which the total solid content in the aqueous compositions is made high to make the amount of water-soluble components, such as surfactants or thickeners, as small as possible, or in which a large amount of low boiling point alcohols, such as methanol, are added to promote drying. However, these methods could not provide sufficiently results with regard to the fast driability. Furthermore, a high value of the total solid content brings about problems of easily damaging the coating and printing workability. On the other hand, the use of a large amount of low boiling point alcohols to achieve the fast driability has problems of air pollution, deterioration of working environment, and necessity to set up solvent treatment apparatuses.

In addition, the conventional aqueous compositions are also inferior with regard to performances, such as adhesion and resistance, when compared with the solvent type compositions. Therefore, for example, in the case where the conventional aqueous compositions are used for gravure ink which is supplied to gravure cylinders having cells formed on their surfaces and is then printed onto substrates, there are problems in that detachment of ink (color migration) occurs according to the substrates, or in that prints become blurred with water and so on.

SUMMARY OF THE INVENTION

A. Object of the Invention

An object of the present invention is to provide an aqueous fast-drying resin composition which is excellent in the fast driability and can exhibit performances with regard to adhesion and resistance on a level with those of solvent type compositions; a production process for the aqueous fast-drying resin composition; and a use of the aqueous fast-drying resin composition as a gravure ink composition.

B. Disclosure of the Invention

The present inventors diligently studied to solve the above problems and, as a result, completed the present invention by finding that: if three components, namely, an anionic resin, an cationic resin, and a polyvalent metallic compound, are allowed to coexist, then excellent fast driability can be exhibited due to the cohesion of the anionic resin and the cationic resin; and a complicated high-molecular matrix is formed due to a stable covalent bond between the anionic resin and the polyvalent metallic compound, and further, the polyvalent metal in this high-molecular matrix forms chelation with an acid functional group of the anionic resin and a basic functional group of the cationic resin to fix them more strongly, with the result that the adhesion and the resistance can be enhanced.

That is to say, an aqueous fast-drying resin composition, according to the present invention, comprises an anionic resin, a cationic resin, and a polyvalent metallic compound.

In addition, another aqueous fast-drying resin composition, according to the present invention, comprises an aqueous medium and a resin component wherein the aqueous medium will be removed by drying, and this aqueous fast-drying resin composition is characterized in that the resin component is combined with a polyvalent metallic compound and includes a combination of an anionic resin and a cationic resin.

A production process for an aqueous fast-drying resin composition, according to the present invention, comprises the step of combining an anionic resin, a cationic resin, and a polyvalent metallic compound.

A gravure ink composition, according to the present invention, comprises an aqueous medium and a resin compound wherein the aqueous medium will be removed by drying, and this gravure ink composition is characterized by comprising an anionic resin, a cationic resin, and a polyvalent metallic compound, and further, a pigment and/or dye.

These and other objects and the advantages of the present invention will be more fully apparent from the following detailed disclosure.

DETAILED DESCRIPTION OF THE INVENTION

An essential component of the aqueous fast-drying resin composition according to the present invention is a resin component that includes a combination of an anionic resin and a cationic resin.

The anionic resin is not especially limited if it is a resin having an anionic functional group which can exhibit anionic character in that presence of a counter ion, and synthetic or natural resins are usable as the anionic resin. Examples thereof includes resins having a carboxyl group as the anionic functional group, specifically: synthetic resins such as ethylene-(meth)acrylic acid copolymer resins, vinyl acetate-(meth)acrylic acid copolymer resins, (meth)acrylate ester-(meth)acrylic acid copolymer resins, styrene-(meth)acrylic acid copolymer resins, styrene-butadiene copolymer resins, styrene-maleic anhydride copolymer resins, carboxyl-group-containing urethane resins, and carboxyl-group-containing polyester resins; and natural resins such as carboxymethyl cellulose. These may be used either alone respectively or in combinations with each other. In addition, the form of these anionic resins when used is not especially limited, but may be either aqueous solution or water dispersion, that is, emulsion.

The resin having a carboxyl group as the anionic functional group is preferably a polymer resin which is obtained by a process including the step of polymerizing a monomer component including at least one unsaturated carboxylic acid.

The above unsaturated carboxylic acid is not especially limited, but examples thereof include: unsaturated monocarboxylic acids such as (meth)acrylic acid, cinnamic acid, and crotonic acid; and unsaturated dicarboxylic acids, such as maleic acid, itaconic acid, and fumaric acid, and monoesters thereof. These may be used either alone respectively or in combinations with each other. In addition, besides these unsaturated carboxylic acids, unsaturated monomers copolymerizable therewith may further be included in the above monomer component. The unsaturated monomer copolymerizable with the unsaturated carboxylic acid is not especially limited, but examples thereof include: (meth)acrylate esters such as methyl (meth)acrylate, butyl (meth)acrylate, and 2-ethylhexyl (meth)acrylate; unsaturated nitriles such as (meth)acrylonitrile; unsaturated amides such as (meth)acrylamide and N-methylol(meth) acrylamide; vinyl esters such as vinyl acetate and vinyl propionate; vinyl ethers such as methyl vinyl ether and ethyl vinyl ether; α-olefins such as ethylene and propylene; halogenated α,β-unsaturated monomers such as vinyl chloride, vinylidene chloride, and vinyl fluoride; and α,β-unsaturated aromatic monomers such as α-methylstyrene and styrene. These may be used either alone respectively or in combinations with each other.

The polymerization method to obtain the polymer resin having a carboxyl group as the anionic functional group is not especially limited, and conventional polymerization methods are usable. Examples thereof include solution polymerization, emulsion polymerization, and suspension polymerization. During the polymerization, as the need arises, a part of the resulting polymer resin may be crosslinked with monomers having more than one copolymerizable unsaturated group in their molecules, such as divinylbenzene, and further, the degree of the polymerization also can be controlled by chain transfer agents such as t-dodecylmercaptan.

The molecular weight of the anionic resin is preferably not lower than 1,000, more preferably not lower than 8,000. In the case where the molecular weight of the anionic resin is lower than 1,000, the increase of the molecular weight during the formation of the matrix is so insufficient that the resultant resin composition layer tends to merely exhibit low resistance.

The glass transition point (Tg) of the anionic resin is preferably in the range of −50 to 130° C., more preferably −10 to 100° C. In the case where the glass transition point (Tg) of the anionic resin is lower than −50° C., the matrix is so excessively softened that the resultant resin composition layer tends to merely exhibit low resistance. On the other hand, in the case where the glass transition point (Tg) of the anionic resin is higher than 130° C., the matrix is so excessively hardened that the resultant resin composition layer tends to be brittle.

The acid value of the anionic resin is preferably in the range of 10 to 800 mg KOH/g, more preferably 30 to 240 mg KOH/g. In the case where the acid value of the anionic resin is lower than 10 mg KOH/g, the formation of the matrix is so insufficient that the resultant resin composition layer tends to merely exhibit low resistance. On the other hand, in the case where the acid value of the anionic resin is higher than 800 mg KOH/g, particularly the water resistance tends to be low.

The content of the anionic resin is preferably in the range of 0.1 to 99.9 weight %, more preferably 30 to 98 weight %, of the total of the anionic resin and the cationic resin. In the case where the content of the anionic resin is lower than 0.1 weight %, the formation of the matrix is so insufficient that the resultant resin composition layer tend to merely exhibit low resistance. On the other hand, in the case where the content of the anionic resin is higher than 99.9 weight %, the content of the cationic resin is so low that the adhesion of the resultant resin composition layer to substrates tends to be low.

The cationic resin is not especially limited if it is a resin having a cationic functional group which can exhibit cationic character in the presence of a counter ion, but examples thereof include those which have an amino group as the cationic functional group, such as basic nitrogen-containing resins (e.g. polyalkylenimines, polyamides, aminosulfopolyesters, polyallylamines, polyvinylamines, and modified polymers thereof.

The polyalkylenimine is, generally, for example, producible by a process including the step of ionically polymerizing an alkylenimine, such as ethylenimine, 1,2-propylenimine, 1,2-dodecylenimine, 1,1-dimethylethylenimine, phenylethylenimine, benzylethylenimine, hydroxylethylethylenimine, aminoethylethylenimine, 2-methylpropylenimine, 3-chloropropylethylenimine, methoxyethylethylenimine, dodecylaziridinyl formate, N-ethylethylenimine, N-(2-aminoethyl)ethylenimine, N-phenethylethylenimine, N-(2-hydroxyethyl)ethylenimine, N-(cyanoethyl)ethylenimine, or N-(p-chlorophenyl)ethylenimine, or by a process including the steps of polymerizing an alkyloxazoline and then partially or entirely hydrolyzing the resultant polymer. However, there is no especial limitation thereto.

The polyvinylamine is, for example, obtainable by a process including the steps of polymerizing N-vinylformamide and then partially or entirely hydrolyzing the resultant poly(N-vinylformamide) with an acid (e.g. hydrochloric acid) or a basic substance, or by a process including the step of reducing polynitroethylene or a derivative therefrom, or by a process including the step of carrying out Hofmann degradation of polyacrylamide, or by a process including the step of carrying out alkali reduction of an N-vinylphthalimide resin. However, there is no especial limitation thereto. Examples of the polyvinylamine include polyvinylamine, polymetavinylamine, polyvinylamine hydrochloride, polyvinylethylamine hydrochloride, polymetavinylmethylamine hydrochloride, and polyvinyl-N-trimethylammonium bromide.

The polyallylamine is, generally, obtainable by a process including the steps of polymerizing a hydrochloride of an allylamine monomer and then removing hydrochloric acid from the resultant polymer. However, there is no special limitation thereto. Examples of the polyallylamine include polyallylamine, polyallylamine hydrochloride, polyallylethylamine hydrochloride, polyallyldimethylethylammonium hydrochloride, diallylamine hydrochloride polymers, diallylmethylamine hydrochloride polymers, diallyldimethylammonium hydrochloride polymers, copolymers thereof with sulfur dioxide, acrylamide copolymers, diallylamine hydrochloride derivative copolymers, and dimethylaminoethyl (meth)acrylate copolymers.

Examples of the polyamide include: polycondensed products which are, for example, obtained by polycondensation including the steps of heating polyalkylenepolyamines (e.g. hexamethylenediamine, 1,4-phenylenediamine, 1,3-phenylenediamine, diethylenetriamine, triethylenetetramine, tetraethylenepentamine, dipropylenepentamine, dipropylenetriamine, tripropylenetetramine, dihexamethylenetriamine) together with dicarboxylic acids (e.g. adipic acid, isophthalic acid, terephthalic acid, succinic acid, maleic acid, glutaric acid, cork acid, sebacic acid) or derivatives therefrom (e.g. acid chlorides) and removing resultant water under vacuum, or by interfacial polycondensation, low-temperature solution polycondensation, polyphosphoric acid solution polycondensation, or solid-state polycondensation; polyaddition products from diisocyanates and dicarboxylic acids;

and ring-opening-polymerized products from lactams. However, there is no especial limitation thereto.

The aminosulfopolyester is, for example, obtainable by a process including the steps of heating a polyalkanolamine (e.g. diethanolamine, N-methyldiethanolamine, triethanolamine), a diol (e.g. diethylene glycol, triethylene glycol, 1,4-cyclohexanedimethanol), a dicarboxylic acid (e.g. adipic acid, isophthalic acid, terephthalic acid, succinic acid, maleic acid, glutaric acid, cork acid, sebacic acid), and 5-sodiosulfoisophthalic acid, and removing resultant water under vacuum, thus carrying out dehydration condensation. However, there is no especial limitation thereto.

Furthermore, products by a process including the step of crosslinking the aforementioned at least two cationic resins to each other with crosslinking agents are also usable. Examples thereof include products by a process including the step of crosslinking polyalkylenimines and polyamides, for example, with epichlorohydrin. However, there is no especial limitation thereto.

In addition, in the case where the cationic resin is a modified polymer, examples thereof include ethylene oxide- or propylene oxide-modified polymers with a modification ratio of 0 to 100%, styrene oxide-modified polymers with a modification ratio of 0 to 90%, and $\alpha,\beta$-unsaturated ester-modified polymers. These may be used either alone respectively or in combinations with each other. In addition, the form of these cationic resins when used is not especially limited, but aqueous solution is preferable.

The molecular weight of the cationic resin is preferably in the range of 300 to 5,000,000, more preferably 600 to 2,700,000. In the case where the molecular weight of the cationic resin is lower than 300, the increase of the molecular weight during the formation of the matrix is so insufficient that the resultant resin composition layer tends to merely exhibit low resistance. On the other hand, in the case where the molecular weight of the cationic resin is higher than 5,000,000, the reaction during the formation of the matrix is so insufficient that the water resistance of the resultant resin composition layer is low.

The content of the cationic resin may fitly be set according to the sort or molecular weight of the cationic resin, but is preferably in the range of 0.1 to 99.9 weight %, more preferably 2 to 70 weight %, of the total of the anionic resin and the cationic resin. In the case where the content of the cationic resin is lower than 0.1 weight %, the adhesion of the resultant resin composition layer to substrates tends to be low. On the other hand, in the case where the content of the cationic resin is higher than 99.9 weight %, the content of the anionic resin is so low that the resultant resin composition layer tends to merely exhibit low resistance.

The resin component, as used in the present invention, may further include a resin other than the anionic resin and the cationic resin. This other resin is not especially limited, and synthetic or natural resins are usable. Examples thereof include: synthetic resins such as polyolefin resins (e.g. polyethylene, ethylene-vinyl acetate copolymers, ethylene (meth)acrylate ester copolymers, polypropylene, and propylene-butene copolymers), diene resins, polystyrene resins (e.g. polystyrene, styrene-butadiene copolymers), poly(vinyl acetate) resins, (meth)acrylate ester resins, acrylonitrile resins, polyether resins (e.g. polyoxymethylene, polyphenylene ether resins), polycarbonate resins, polyester resins, unsaturated polyester resins, polyurethane resins, epoxy resins, and polyimide resins; and natural resins such as casein.

In the aqueous fast-drying resin composition according to the present invention, the resin component is combined with a polyvalent metallic compound.

The polyvalent metallic compound is not especially limited if it can form a covalent bond with an acid functional group, such as carboxyl group, of the anionic resin or a basic functional group, such as amino group, of the cationic resin. Examples of metal species of the polyvalent metallic compound include zirconium, zinc, and boron, and examples of ligands of the polyvalent metallic compound include ammonium hydroxide, ammonium carbonate, carboxylic acids, and halides. Specific examples of polyvalent metallic compounds, comprising these metal species and ligands, include ammonium zirconium carbonate, zirconium acetate, zirconium propionate, zirconium sulfate, zirconium nitrate, zirconium hydroxychloride, zirconium oxychloride, zirconium phosphate, zirconium potassium carbonate, zirconium ammonium fluoride, ammonium zinc carbonate, and borates. In addition, the polyvalent metallic compound may be that which is prepared by stabilizing the compound comprising the above metal species and the above ligand, for example, by tartaric acid or gluconic acid. These polyvalent metallic compounds may be used either alone respectively or in combinations with each other.

The content of the polyvalent metallic compound is preferably in the range of 0.1 to 50 weight %, more preferably 2 to 40 weight %, of the total of the anionic resin and the cationic resin. In the case where the content of the polyvalent metallic compound is lower than 0.1 weight %, the reaction during the formation of the matrix is so insufficient that the water resistance and the solvent resistance of the resultant resin composition layer are low. On the other hand, in the case where the content of the polyvalent metallic compound is higher than 50 weight %, the crosslinking reaction during the formation of the matrix runs so excessively that the resultant resin composition layer tends to be brittle.

In the aqueous fast-drying resin composition according to the present invention, preferably, the resin component is further combined with a volatile basic compound. The presence of the volatile basic compound protects the acid functional group of the anionic resin during the period before the use of the resin composition, and can thereby enhance the storage stability of the resin composition. In addition, this volatile basic compound easily volatilizes when the resin composition is used, therefore the protected acid functional group rapidly contributes to the formation of the matrix, with the result that drying is promoted, and further that the resistance is given.

Examples of the volatile basic compound include ammonia, morpholine, alkylamines, 2-dimethylaminoethanol, N-methylmorpholine, and ethylenediamine. These may be used either alone respectively or in combinations with each other.

The content of the volatile basic compound may fitly be set according to its sort or basicity, and is not especially limited if this content is such that the pH of the resin composition can be increased to a value to nonionize the basic functional group of the cationic resin. Specifically, it is preferable that the volatile basic compound is used in a manner such that the pH of the resin composition, as adjusted with the volatile basic compound, can be not lower than 8. In the case where the pH of the resin composition, as adjusted with the volatile basic compound, is lower than 8, the storage stability of the resin composition is damaged, and further, the adhesion or resistance of the resultant resin composition layer tends to be low.

The aqueous fast-drying resin composition according to the present invention comprises an aqueous medium along with the resin component and the polyvalent metallic compound. The aqueous medium is not especially limited, but the most preferable one is a water alone solvent. In addition, for example, one or more kinds of water-soluble organic solvents having low boiling points, such as methanol and ethanol, may be used, or any mixture thereof with water may be used.

The aqueous fast-drying resin composition according to the present invention preferably has a total solid content of not lower than 1 weight %. In the case where the total solid content in the resin composition is lower than 1 weight %, the fast driability tends to be insufficient. Accordingly, the aforementioned aqueous medium is usually used to adjust the total solid content in the resin composition to not lower than 1 weight %.

The aqueous fast-drying resin composition according to the present invention may further comprise a colorant according to uses of the resin composition. The colorant is not especially limited, but examples thereof include: various organic or inorganic pigments; and various dyes such as acid dyes, direct dyes, reactive dyes, disperse dyes, food colors, and fluorescent brightening agents. More specific examples thereof include: pigments such as C. I. Pigment Yellow 1, 3, 12, 13, 14, 17, 24, 34, 35, 37, 42, 53, 55, 81, 83, 95, 97, 98, 100, 101, 104, 108, 109, 110, 117, 120, 138, 153, C. I. Pigment Orange 5, 13, 16, 17, 36, 43, 51, C. I. Pigment Red 1, 2, 3, 5, 17, 22, 23, 31, 38, 48:1, 48:2, 48:3, 48:4, 49:1, 49:2, 52:1, 52:2, 53:1, 57:1, 60:1, 63:1, 63:2, 64:1, 81, 83, 88, 101, 104, 105, 106, 108, 112, 114, 122, 123, 146, 149, 166, 168, 170, 172, 177, 178, 179, 185, 190, 193, 209, 216, C. I. Pigment Violet 1, 3, 5:1, 16, 19, 23, 38, C. I. Pigment Blue 1, 2, 15, 15:1, 15:2, 15:3, 15:4, 15:6, 16,17:1, 18, 24, 27, 28, 29, 56, 60, 61, 63, C. I. Pigment Green 1, 4, 7, 8, 10, 17, 18, 36, C. I. Pigment Brown 25, C. I. Pigment Black 1, 7, 11, C. I. Pigment Metal 1, 2 C. I. Pigment White, 1, 4, 5, 6, 18, 21, 24, 27, pearly pigments, and daylight fluorescent pigments; and dyes such as C. I. Acid Black 1, 2, 7, 16, 17, 24, 26, 28, 31, 41, 48, 52, 56, 58, 60, 63, 94, 107, 109, 112, 118, 119, 121, 122, 131, 155, 156, 172, 194, 208, C. I. Acid Blue 1, 7, 9, 22, 23, 25, 27, 29, 40, 41, 43, 45, 49, 51, 53, 55, 56, 59, 62, 78, 90, 91, 92, 93, 102, 104, 111, 113, 117, 120, 124, 126, 145, 167, 171, 175, 183, 185, 229, 234, 236, 254, C. I. Acid Brown 4, 14, C. I. Acid Green 3, 9, 12, 16, 19, 20, 25, 27, 41, C. I. Acid Orange 7, 8, 10, 33, 56, 64, C. I. Acid Red, 1, 4, 6, 8, 13, 14, 15, 18, 19, 21, 26, 27, 30, 32, 34, 37, 38, 40, 42, 45, 51, 52, 54, 57, 80, 82, 83, 85, 87, 88, 89, 92, 94, 97, 106, 108, 110, 111, 119, 129, 131, 134, 135, 154, 155, 172, 176, 180, 184, 186, 187, 243, 249, 254, 256, 257, 270, 289, 317, 318, C. I. Acid Violet 7, 11, 15, 34, 35, 41, 43, 49, 75, C. I. Acid Yellow 1, 3, 4, 7, 11, 12, 13, 14, 17, 18, 19, 23, 25, 29, 34, 36, 38, 40, 41, 42, 44, 49, 53, 55, 59, 61, 71, 72, 76, 78, 99, 111, 114, 116, 122, 135, 161, 172, C. I. Basic Black 2, 8, C. I. Basic Blue 1, 3, 5, 7, 9, 24, 25, 26, 28, 29, C. I. Basic Brown 1, 12, C. I. Basic Green 1, 4, C. I. Basic Orange 2, 15, 21, 22, C. I. Basic Red 1, 2, 9, 12, 13, 37, C. I. Basic Violet 1, 3, 5, 7, 9, 24, 25, 26, 28, 29, C. I. Basic Yellow 1, 2, 11, 12, 14, 21, 32, 36, C. I. Reactive Black 1, 3, 5, 6, 8, 12, 14, C. I. Reactive Blue 2, 5, 7, 12, 13, 14, 15, 17, 18, 19, 20, 21, 25, 27, 28, 37, 38, 40, 41, 71, C. I. Reactive Brown 1, 7, 16, C. I. Reactive Green 5, 7, C. I. Reactive Orange 2, 5, 7, 16, 20, 24, C. I. Reactive Red 6, 7, 11, 12, 15, 17, 21, 23, 24, 35, 36, 42, 63, 66, C. I. Reactive Violet 2, 4, 5, 8, 9, C. I. Reactive Yellow 1, 2, 3, 13, 14, 15, 17, C. I. Food Black 2, C. I. Food Blue 3, 4, 5, C. I. Food Green 2, 3, C. I. Food Red 2, 3, 7, 9, 14, 52, 87, 92, 94, 102, 104, 105, 106, C. I. Food Violet 2, and C. I. Food Yellow 3, 4, 5. When these colorants are used, the amount thereof is preferably in the range of 1 to 300 weight %, more preferably 5 to 200 weight %, of the total of the anionic resin and the cationic resin.

As the need arises, the aqueous fast-drying resin composition according to the present invention may further comprise various additives such as plasticizers, wax, moisture-keeping agents, defoamers, surfactants, wetting agents, leveling agents, thickeners, rheology modifiers, sequestering agents, biocides, dispersants, fillers (e.g. calcium carbonate, talc, clay, silica, silicate), freezing inhibitors, freezing or defreezing stabilizers, preservatives, anticorrosives, color water-holding improvers, antistatic agents, antioxidants, ultraviolet inhibitors, and fluorescent brightening agents. The amount of these additives as used may be set fitly within the range that does not damage the effects of the present invention.

The aqueous fast-drying resin composition according to the present invention is obtainable by combining the anionic resin, the cationic resin, and the polyvalent metallic compound, but the production process for this resin composition is not especially limited. In detail, the above three indispensable components (i.e. anionic resin, cationic resin, and polyvalent metallic compound) and the aqueous medium, and further, if necessary, the above colorants or other additives, may be mixed in any order and in any manner. For example, in view of the storage stability, two of the above three indispensable components may be premixed, and then the remaining one indispensable component may be added just before the resin composition is used. As to preferable form of the aqueous fast-drying resin composition according to the present invention, the form in which the aqueous fast-drying resin composition contains the anionic resin, the cationic resin, and the polyvalent metallic compound simultaneously with each other, namely, the three indispensable components are mixed together in the initial stage, is desirable.

The aqueous fast-drying resin composition according to the present invention is specifically producible with conventional stirring, dispersing, and crushing apparatuses such as stirrers (e.g. paddle vanes), high-speed agitation dispersing machines, high-pressure homogenizers, ball mills, sand mills, Attritor, basket mills, roller mills, and vibratory dispersing machines. In addition, as the need arises, coarse particles and so on can be removed, for example, through strainers.

As to the aqueous fast-drying resin composition according to the present invention, the aqueous medium will be removed by drying. For example, immediately after the aqueous fast-drying resin composition according to the present invention has been attached to a substrate, the cohesion of the anionic resin and the cationic resin occurs to extrude the aqueous medium out of the system, with the result that excellent fast driability is exhibited. In addition, in the resin composition after the aqueous medium has been removed therefrom, a complicated high-molecular matrix is formed due to a stable covalent bond between the anionic resin and the polyvalent metallic compound, and further, the polyvalent metal in this high-molecular matrix forms chelation with an acid functional group of the anionic resin and a basic functional group of the cationic resin to fix them more strongly, with the result that a film which exhibits extremely excellent adhesion and resistance can be formed. That is to say, the aqueous fast-drying resin composition according to the present invention can exhibit excellent fast driability due to the coexistence of the three components, namely, the anionic resin, the cationic resin, and the polyvalent metallic compound, and further can exhibit extremely excellent adhesion and resistance due to synergistic effects of the three components.

The gravure ink composition, according to the present invention, comprises the aqueous medium and the resin component wherein the aqueous medium will be removed by drying, and this gravure ink composition comprises the anionic resin, the cationic resin, and the polyvalent metallic compound, and further, the pigment and/or dye. If such a gravure ink composition according to the present invention is used to carry out gravure printing, then it can effectively avoid the problems, which cannot be solved by conventional aqueous resin compositions, with regard to resistance (e.g. water resistance, solvent resistance, and abrasion resistance), driability, and adhesion.

As a matter of course, the aqueous fast-drying resin composition according to the present invention is applicable to a wide range of uses, such as various inks (e.g. ink for flexography, ink for ink jet printers), coating agents (e.g. for receiving-layer of receiving-paper for ink jet printers), paints (e.g. traffic paints), adhesives, primers, or pressure sensitive adhesives for various substrates, besides the aforementioned gravure ink.

The method for coating the aqueous fast-drying resin composition according to the present invention is not especially limited, and, for example, conventional coating methods and apparatuses can be used such as gravure coating, gravure reverse coating, knife coating, comma coating, slot die coating, slide die coating, air knife coating, blade coating, bar coating, kiss coating, spray coating, air spray coating, roller coating, brush coating, curtain coating, flood coating, and dip coating.

Various substrates to coat with the present invention aqueous fast-drying resin composition are not especially limited, but examples thereof include: organic substrates such as olefinic resins (e.g. polyethylene, polypropylene), polystyrenic resins, nylon, polyester resin (e.g. PET), cellophane, vinyl chloride resins and vinylidene chloride resins; paper substrates such as fine quality paper, kraft paper, crepe paper, glassine, and plastic-coated paper; inorganic substrates such as metals (e.g. iron, aluminum, copper) and glass; and wood. The foam of these substrates is not especially limited, but examples thereof include films, sheets, and plate-shaped molded products.

(Effects and Advantages of the Invention):

The present invention can provide: an aqueous fast-drying resin composition which is excellent in the fast driability and can exhibit performances with regard to adhesion and resistance on a level with those of solvent type compositions; a production process for the aqueous fast-drying resin compositions; and a use of the aqueous fast-drying resin composition as a gravure ink composition.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited thereto. Incidentally, unless otherwise noted, the units "part(s)" and "%" as referred to in the example and the comparative examples are by weight.

(EXAMPLE 1)

An amount of 56.6 parts of water-soluble anionic resin A (styrene-acrylic resin, acid value=195 mg KOH/g, Tg=70° C., solid content=30%), 16.6 parts of water-dispersible anionic resin B (styrene-acryl resin, acid value=55 mg KOH/g, Tg=37° C., solid content=46%), 2.4 parts of polyamide-modified polyethylenimine A (as further modified with styrene oxide) (weight-average molecular weight (LS) of polyamide-modified polyethylenimine=2,700,000, styrene oxide modification ratio=25 mol %, solid content= 20%), 14.3 parts of ammonium zirconium carbonate (solid content=20%), 8.3 parts of polyethylene wax (solid content= 25%), 0.9 parts of plasticizer (butylbenzyl phthalate), and 0.9 parts of water were placed into a dispersion vessel, and then stirred at 2,000 rpm with a dispersing machine for 5 minutes, thus obtaining a resin composition having a total solid content of 32%.

The resultant resin composition was coated onto an OPP film (which had been treated with corona discharge) with a bar coater so that the thickness of the resulting solid deposit would be about 3 $\mu$m, and immediately thereafter, a water resistance test was carried out in the following way. Results are shown in Table 1.

(Water Resistance Test): Just after the above coating step, a water drop was dropped onto the coating film surface and then left for 10 minutes. How long time passed since then until no change of the coating film was seen was measured with the eye to evaluate the water resistance on the following standard:

A: The time was shorter than 15 minutes. B: The time was in the range of 15~30 minutes (but not including 30 minutes). C: The time was not shorter than 30 minutes.

Furthermore, the film, as obtained by being coated with the resin composition in the above way, was aged at 25° C., 60% RH for 24 hours. Various evaluations of this aged film were made in the following ways. Results are shown in Table 1.

(Appearance of Coating film): The appearance of the coating film was observed with the eye and evaluated on the following standard:

A: There was no problem such as cracks. C: There were appearance defects such as cracks.

(Water Resistance Rubbing Test): Cotton wool which had been immersed into water was allowed to go back and forth 200 times on the coating film with a Southerland Rub-o-tester to measure the number of times as needed for a change of the coating film. The evaluation was made on the following standard:

A: No change was seen even in 200 times. B: A change was seen in 100~200 times, exclusive of 200 times. C: A change was seen in less than 100 times.

(Alcohol Resistance Rubbing Test): Cotton wool which had been immersed into 80% ethanol was allowed to go back and forth 100 times on the coating film with a Southerland Rub-o-tester to measure the number of times as needed for a change of the coating film. The evaluation was made on the following standard:

A: No change was seen even in 100 times. B: A change was seen in 50~100 times, exclusive of 100 times. C: A change was seen in less than 50 times.

(Adhesion Test): A pressure sensitive adhesive tape of 12 mm in width was attached onto the coating film surface, and then forcibly peeled off to observe with the eye whether the coating film peeled off from the substrate or not. The evaluation was made on the following standard:

A: Not peeled off. C: Peeled off.

(EXAMPLE 2)

A resin composition having a total solid content of 21% was obtained in the same way as of Example 1 except that the polyamide-modified polyethylenimine A (as further modified with styrene oxide) was replaced with propylene oxide-modified polyethylenimine B (number-average molecular weight (GPC) of polyethylenimine=600, modification ratio=100 mol %, solid content=50%), and that a surfactant (acetylenediol type) was further used, and that the mixing ratio of the components was as shown in Table 1.

The resultant resin composition was subjected to various tests in the same way as of Example 1. Results are shown in Table 1.

(EXAMPLE 3)

A resin composition having a total solid content of 35% was obtained in the same way as of Example 1 except that the polyamide-modified polyethylenimine A (as further modified with styrene oxide) was replaced with polyethylenimine C (weight-average molecular weight (LS)=750,000, solid content=50%), and that the mixing ratio of the components was as shown in Table 1.

The resultant resin composition was subjected to various tests in the same way as of Example 1. Results are shown in Table 1.

(EXAMPLE 4)

A resin composition having a total solid content of 33% was obtained in the same way as of Example 1 except that the polyamide-modified polyethylenimine A (as further modified with styrene oxide) was replaced with styrene oxide-modified polyethylenimine D (number-average molecular weight (GPC) of polyethylenimine=600, modification ratio=25 mol %, solid content=59%), and that the mixing ratio of the components was as shown in Table 1.

The resultant resin composition was subjected to various tests in the same way as of Example 1. Results are shown in Table 1.

(COMPARATIVE EXAMPLES 1 and 2)

Resin compositions having a total solid content of 38% (Comparative Example 1) and 32% (Comparative Example 2) respectively were obtained in the same way as of Example 1 except that the components and the mixing ratio thereof were as shown in Table 1.

The resultant resin compositions were subjected to various tests in the same way as of Example 1. Results are shown in Table 1.

(COMPARATIVE EXAMPLE 3)

A resin composition having a total solid content of 31% was obtained in the same way as of Example 1 except that the polyamide-modified polyethylenimine A (as further modified with styrene oxide) was replaced with propylene oxide-modified polyethylenimine E (number-average molecular weight (GPC) of polyethyleimine=230,000, modification ratio=100 mol %, solid content=50%), and that the mixing ratio of the components was as shown in Table 1.

The resultant resin composition was subjected to various tests in the same way as of Example 1. Results are shown in Table 1.

TABLE 1

|  | Example 1 | Example 2 | Example 3 | Example 4 | Comparative Example 1 | Comparative Example 2 | Comparative Example 3 |
|---|---|---|---|---|---|---|---|
| Composition (weight parts) | | | | | | | |
| Anionic resin A | 56.6 | 37.6 | 40.8 | 56.4 | 48.9 | 66.1 | — |
| Anionic resin B | 16.6 | 11.0 | 11.7 | 16.5 | 14.1 | 19.4 | — |
| Polyethylenimine A | 2.4 | — | — | — | — | — | — |
| Polyethylenimine B | — | 6.0 | — | — | — | — | — |
| Polyethylenimine C | — | — | 25.0 | — | 30.1 | — | — |
| Polyethylenimine D | — | — | — | 6.2 | — | — | — |
| Polyethylenimine E | — | — | — | — | — | — | 55.6 |
| Ammonium zirconium carbonate | 14.3 | 4.1 | 16.7 | 12.6 | — | 14.5 | 13.9 |
| Polyethylene wax | 8.3 | 5.5 | 5.8 | 8.3 | 6.9 | — | — |
| Plasticizer | 0.9 | 0.6 | — | — | — | — | — |
| Surfactant | — | 0.1 | — | — | — | — | — |
| Water | 0.9 | 35.1 | — | — | — | — | 30.5 |
| Appearance of coating film | A | A | A | A | A | C | A |
| Water resistance test | A | B | A | A | C | A | C |
| Water resistance rubbing test | A | A | A | A | C | B | C |
| Alcohol resistance rubbing test | A | A | A | A | C | B | C |
| Adhesion test | A | A | A | A | A | C | A |

(EXAMPLES 5 and 6 and COMPARATIVE EXAMPLES 4 and 5)

Gravure ink was obtained in the same way as of Example 1 except that C. I. Pigment Black or C. I. Pigment White was further used, and that the mixing ratio of the components was as shown in Table 2.

The resultant ink was coated onto an OPP film (which had been treated with corona discharge) with a bar coater so that the thickness of the resulting solid deposit would be about 3 μm, and immediately thereafter, a dry-to-touch test was carried out in the following way. Results are shown in Table 2.

(Dry-To-Touch Test): Just after the above coating step, the coating film surface was fingered to measure how long time passed until no fingerprint was left. The evaluation was made on the following standard:

A: The time was shorter than 2 minutes. C: The time was not shorter than 2 minutes.

Furthermore, the film, as obtained by being coated with the ink in the above way, was aged at 30° C., 60% RH for 24 hours. Various evaluations of this aged film were made in the following ways. Results are shown in Table 2.

(Appearance of Coating film): The appearance of the coating film was observed with the eye and evaluated on the following standard:

A: There was no problem such as cracks. C: There were appearance defects such as cracks.

(Water Resistance Rubbing Test): Cotton wool which had been immersed into water was allowed to go back and forth 200 times on the coating film with a dyeing friction colorfastness testing machine to observed with the eye a change of the coating film. The evaluation was made on the following standard:

A: No change was seen. C: Scratches, elution, or peeling off was seen.

(Alcohol Resistance Rubbing Test): Cotton wool which had been immersed into 80% ethanol was allowed to go back and forth 10 times on the coating film with a dyeing friction colorfastness testing machine to observe with the eye a change of the coating film. The evaluation was made on the following standard:

A: No change was seen. C: Scratches, elution, or peeling off was seen.

(Adhesion Test): A pressure sensitive adhesive tape of 12 mm in width was attached onto the coating film surface, and then forcibly peeled off to observe with the eye whether the coating film peeled off from the substrate or not. The evaluation was made on the following standard:

A: Not peeled off. C: Peeled off.

TABLE 2

|  | Example 5 | Example 6 | Comparative Example 4 | Comparative Example 5 |
|---|---|---|---|---|
| Composition (weight parts) |  |  |  |  |
| Anionic resin A | 49.0 | 43.3 | 45.5 | 46.6 |
| Anionic resin B | 17.6 | 12.6 | 13.2 | 13.5 |
| Polyethylenimine B | 9.6 | 6.9 | 7.2 | — |
| Ammonium zirconium carbonate | 6.6 | 4.7 | — | 5.0 |
| Polyethylene wax | 8.8 | 6.3 | 6.6 | 6.8 |
| Plasticizer | 1.0 | 0.7 | 0.7 | 0.7 |
| Surfactant | 0.2 | 0.1 | 0.1 | 0.1 |
| Water | — | 0.6 | 0.6 | 0.7 |
| C. I. Pigment Black | 7.2 | — | — | — |
| C. I. Pigment White | — | 24.8 | 26.1 | 26.6 |
| Appearance of coating film | A | A | A | A |
| Dry-to-touch test | A | A | A | C |
| Water resistance rubbing test | A | A | C | A |
| Alcohol resistance rubbing test | A | A | C | C |
| Adhesion test | A | A | C | A |

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. An aqueous fast-drying resin composition, which comprises anionic resins, a cationic resin, and a polyvalent metallic compound, wherein the anionic resins comprise a first anionic resin and a second anionic resin, wherein the first anionic resin is a water-soluble anionic resin and wherein the second anionic resin is a water-dispersible anionic resin.

2. An aqueous fast-drying resin composition, which comprises an aqueous medium and a resin component wherein the aqueous medium will be removed by drying, with the aqueous fast-drying resin composition being characterized in that the resin component is combined with a polyvalent metallic compound and includes a combination of anionic resins and a cationic resin, wherein the anionic resins comprise a first anionic resin and a second anionic resin, wherein the first anionic resin is a water-soluble anionic resin and wherein the second anionic resin is a water-dispersible anionic resin.

3. An aqueous fast-drying resin composition according to claim 1, wherein said resins make up a resin component and wherein the resin component is further combined with a volatile basic compound.

4. An aqueous fast-drying resin composition according to claim 2, wherein said resins make up a resin component and wherein the resin component is further combined with a volatile basic compound.

5. An aqueous fast-drying resin composition according to claim 1, which is used as gravure ink.

6. An aqueous fast-drying resin composition according to claim 2, which is used as gravure ink.

7. An aqueous fast-drying resin composition according to claim 1, which further comprises one or more additives.

8. An aqueous fast-drying resin composition according to claim 7, wherein one of the additives is a surfactant.

9. An aqueous fast-drying resin composition according to claim 8, wherein the surfactant is an acetylenediol type surfactant.

10. An aqueous fast-drying resin composition according to claim 7, wherein one of the additives is a plasticizer.

11. An aqueous fast-drying resin composition according to claim 10, wherein the plasticizer is butylbenzyl phthalate.

12. An aqueous fast-drying resin composition according to claim 2, which further comprises one or more additives.

13. An aqueous fast-drying resin composition according to claim 12, wherein one of the additives is a surfactant.

14. An aqueous fast-drying resin composition according to claim 13, wherein the surfactant is an acetylenediol type surfactant.

15. An aqueous fast-drying resin composition according to claim 12, wherein one of the additives is a plasticizer.

16. An aqueous fast-drying resin composition according to claim 15, wherein the plasticizer is butylbenzyl phthalate.

17. A production process for an aqueous fast-drying resin composition, which comprises the step of combining anionic resins, a cationic resin, and a polyvalent metallic compound, wherein the anionic resins comprise a first anionic resin and a second anionic resin, wherein the first anionic resin is a water-soluble anionic resin and wherein the second anionic resin is a water-dispersible anionic resin.

18. A gravure ink composition, which comprises an aqueous medium and a resin component wherein the aqueous medium will be removed by drying, with the gravure ink composition being characterized by comprising an anionic resin, a cationic resin, and a polyvalent metallic compound, and further, a pigment and/or dye, wherein the anionic resin essentially comprises a water-soluble anionic resin and a water-dispersible anionic resin.

\* \* \* \* \*